United States Patent [19]

Goman et al.

[11] Patent Number: 5,715,667
[45] Date of Patent: Feb. 10, 1998

[54] WING DECK MOUNTING AND LIFT MECHANISM

[75] Inventors: Gerald Eugene Goman, Horicon, Wis.; Marlyn Lee Jerke, Cedar Falls, Iowa

[73] Assignee: Deere & Company, Moline, Ill.

[21] Appl. No.: 645,367

[22] Filed: May 13, 1996

[51] Int. Cl.$^6$ ...................................... A01D 34/66
[52] U.S. Cl. ...................... 56/13.6; 56/6; 56/15.2
[58] Field of Search ............... 56/6, 7, 13.6, 15.8, 56/15.9, DIG. 1, DIG. 22, 17.1, 15.2, 15.4, 15.6

[56] References Cited

U.S. PATENT DOCUMENTS

| | | | |
|---|---|---|---|
| 3,500,619 | 3/1970 | Bacon | 56/13.6 X |
| 3,736,735 | 6/1973 | Kulak et al. | 56/13.6 |
| 4,497,160 | 2/1985 | Mullet et al. | 56/13.6 X |
| 4,573,306 | 3/1986 | Smith et al. | 56/13.6 X |
| 4,742,671 | 5/1988 | Bich | 56/15.9 |
| 4,854,112 | 8/1989 | Holley et al. | 56/6 |
| 4,864,805 | 9/1989 | Hager et al. | 56/11.9 |
| 4,869,057 | 9/1989 | Siegrist | 56/15.8 X |
| 4,974,399 | 12/1990 | Haberkorn | 56/6 |
| 5,241,808 | 9/1993 | Colistro | 56/6 |
| 5,381,647 | 1/1995 | Eberle | 56/15.8 |
| 5,463,853 | 11/1995 | Santoli et al. | 56/6 |

OTHER PUBLICATIONS

The Toro Company, brochure title unknown, 1 page, date unknown, published in the U.S.A.
The Toro Company, brochure entitled "Toro Groundsmaster 455-D", 3 pages, dated 1994, published in the U.S.A.

*Primary Examiner*—Terry Lee Melius
*Assistant Examiner*—Robert Pezzuto

[57] ABSTRACT

A mechanism for mounting a mower deck to a vehicle, the mechanism including a first member which pivots about a first pivot mechanism as the mower pivots to ride over ground undulations. When raised by the operator, the deck will pivot about the first pivot mechanism until the first member abuts a second member supported by a second pivot mechanism. As the deck continues to be raised it will pivot about the second pivot mechanism. A link coupled between the vehicle frame and the second member causes the second member to also pivot about a third pivot mechanism which swings the deck rearwardly as it is raised.

8 Claims, 10 Drawing Sheets

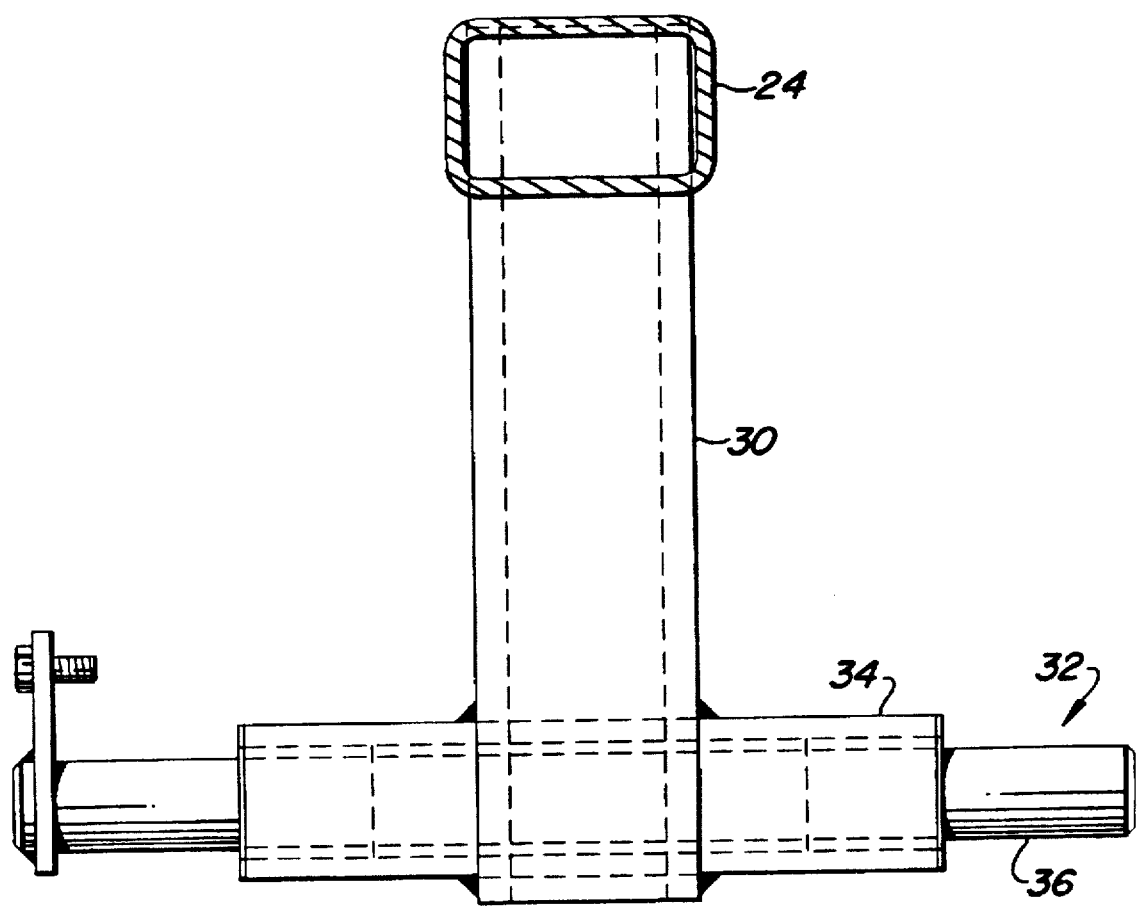

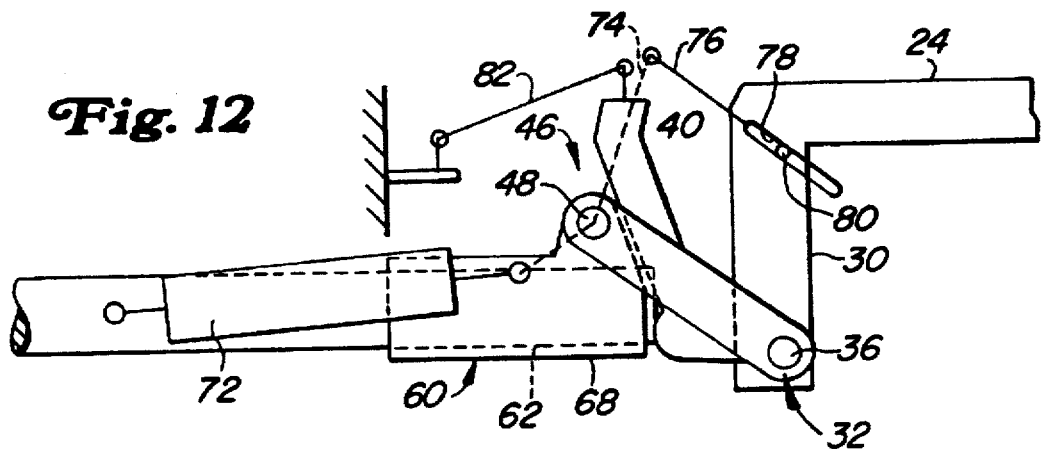
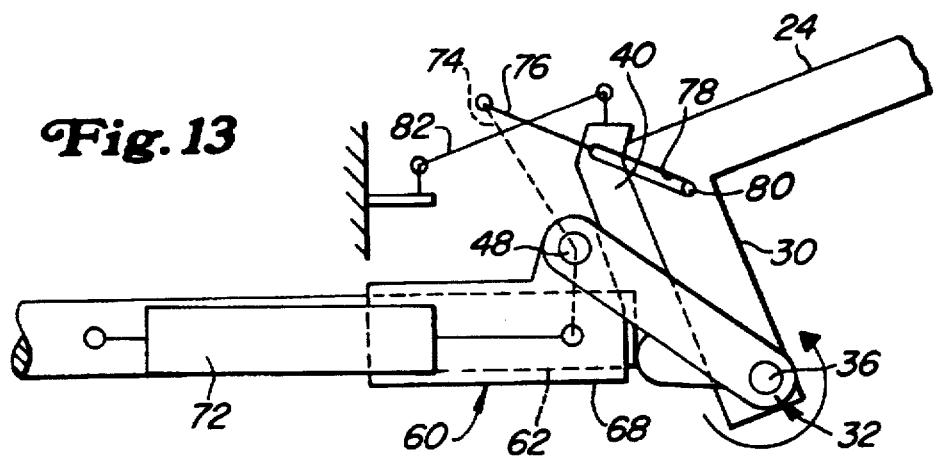
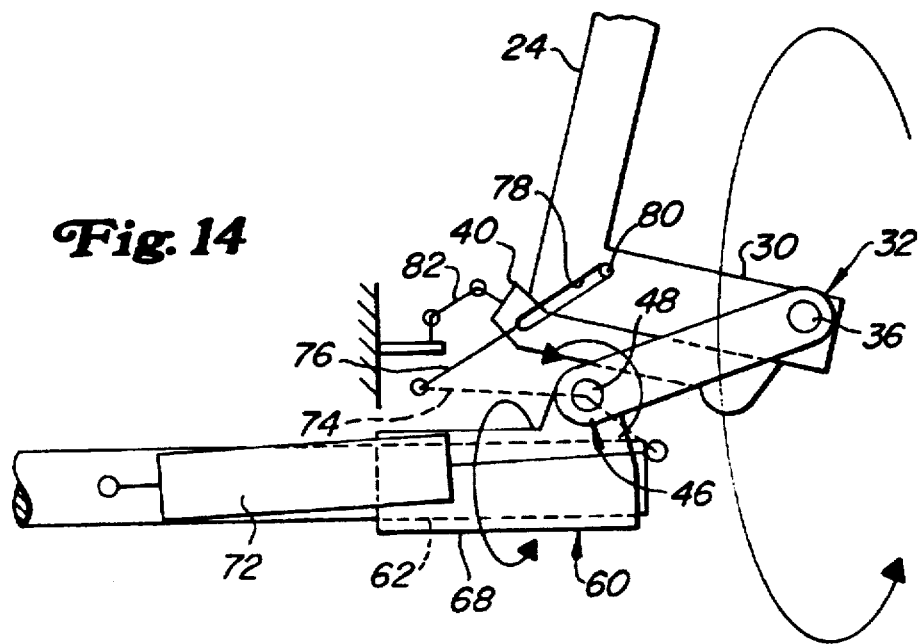

WING DECK MOUNTING AND LIFT MECHANISM

FIELD OF THE INVENTION

This invention relates to mounting mechanisms which couple implements such as mower decks to vehicles, and the mechanisms which lift these mower decks to a transport position.

BACKGROUND OF THE INVENITON

Conventional wide area mowing vehicles have been provided having a rotary mower deck mounted in front of the vehicle and a pair of wing decks mounted to the sides of the vehicle. These mowers mow a relatively large area of grass with each pass of the vehicle. The wing decks mounted to the sides of the vehicle are typically provided with pivot mechanisms which allow the wing deck to pivot about a longitudinal axis with respect to the vehicle in order to allow the mower deck to more closely follow undulations in ground contour. This allows grass to be cut at a relatively uniform height to enhance cut quality. The pivot axis which allows the wing decks to follow ground contours is ideally located near the level of the cutting blades. This reduces the possibility of an uncut strip of grass being left when the wing deck pivots up over ground undulations.

It is also known to provide such wide area mowing vehicles with mechanisms for raising the wing decks to a transport position. Since the wing decks extend so far from the side of the deck, the operator must often raise one or both of the wing decks so that the vehicle can pass by an obstruction or through a narrow passage such as a gate. It is also desirable to raise the decks to a transport position when the vehicle is traveling at high speeds such as when being driven between mowing sites. Some conventional wide area mowers provide a relatively high pivot axis about which the wing decks pivot to their transport position. The high pivot axis allows the deck to pivot upwardly relatively quickly, and once raised provides sufficient ground clearance for the vehicle to traverse obstacles such as curbs.

Some conventional wide area mowers provide a single pivot axis about which the wing deck pivots to follow ground undulations and to be raised to a transport position. Conventional mowers that position this single pivot axis near the level of the cutting blades generally prevent uncut strips of grass from being left when the wing deck pivots up over ground undulations, but do not provide much ground clearance when the wing deck is raised to the transport mode since the pivot axis is relatively low. Conventional mowers that position a single pivot axis above the level of the cutting blades provide good ground clearance when the deck is in the raised transport position, but can tend to leave an uncut strip of grass when the deck pivots with respect to the vehicle to follow ground undulations during operation. Conventional mowers that provide more than one pivot axis tend to be relatively complicated and require a large number of parts, thereby raising the cost of the mower. Furthermore, conventional wide area mowers raise the wing decks to a position that is to the side of and often in front of the operator seated on the vehicle. The raised positions of these conventional wing decks can obstruct the operator's line of sight during vehicle travel. Furthermore, the position of these conventional wing decks can block or obstruct the operator from climbing in and out of the operator station of the vehicle.

Therefore it would be desirable to provide a wide area mower having wing decks that closely follow ground undulations for good cut quality and which do not leave uncut strips of grass when the wing decks pivot to ride over ground undulations. It would also be desirable for such a mower to allow the wing decks to pivot up to a transport position rapidly and so that a sufficient amount of ground clearance is provided for traversing such obstacles as curbs. It would also be desirable for such a mower to position the wing decks in a transport mode such that the decks do not obstruct the view from the operator's station or block the operator from easily climbing on or off the vehicle. It would also be desirable for such a mower mechanism to be relatively simple in design such that it includes relatively few parts and is relatively inexpensive to assemble and manufacture.

SUMMARY OF THE INVENTION

The present invention provides a mechanism for mounting a wing deck to a vehicle. A push arm is coupled with the mower deck and includes a first member pivotally coupled with a second member by way of a first pivot mechanism. The first pivot mechanism defines a longitudinally extending pivot axis positioned proximate the blade line. The second member is pivotally coupled with a third member by way of a second pivot mechanism. The second pivot mechanism defines a longitudinally extending pivot axis positioned substantially above the first pivot mechanism. The third member is pivotally mounted to the frame of the vehicle by way of a third pivot mechanism having a laterally extending pivot axis. As the mower encounters ground undulations, the mower deck, push arm and first member pivot about the first pivot mechanism to allow the deck to pivot with respect to the vehicle and closely follow ground contours. Since the first pivot axis is located proximate the blade line of the mower decks, little or no uncut strips of grass will be left when the mower deck pivots over ground undulations. The present invention allows the operator to raise the deck over ground obstructions such as curbs or to lift the deck to a transport position. To do so, the operator initiates extension of a hydraulic cylinder. Extension of the cylinder causes a lever to pull upwardly on the push arm. The push arm, mower deck and first member are thereby caused to pivot upwardly about the first pivot mechanism. As the deck continues to be lifted, the first member will eventually abut against the second member, at which point the first and second members, first pivot mechanism, push arm and mower deck begin pivoting together about the second pivot mechanism. A link member which extends between the frame of the vehicle and the second member operatively causes the second member and mower deck to also pivot about the third pivot mechanism after the first member abuts the second member. The mower deck will therefore simultaneously pivot about the second and third pivot mechanisms after the first member abuts the second member. The deck swings upwardly as it pivots about the second pivot axis, and rearwardly as it pivots about the third pivot axis.

The present invention therefore provides a low first pivot axis proximate the blade line which eliminates uncut strips of grass when the mower deck pivots with respect to the vehicle to closely follow ground undulations. The present invention provides a relatively high second pivot axis about which the deck will pivot to be quickly raised to a transport position, and which provides adequate ground clearance when the deck is raised. The present invention also provides a third pivot axis which swings the mower deck rearwardly as it is lifted to its transport position so that the deck does not block or obstruct the operators line of sight during mowing operations. The rearward shifting of the deck when raised according to the present invention also serves to swing the decks out of the operators way such that the raised deck does not interfere with or block the operator from climbing on to or off of the vehicle when parked. The present invention accomplishes all of these functions with a relatively simple construction having relatively few pads. The cost of manufacture and assembly is therefore relatively low.

BRIEF DESCRIPTION OF THE DRAWINGS

FIG. 9 is a side sectional view of the push arm, first member and first pivot mechanism.

FIG. 12 is a schematic rear view of the mounting mechanism when the mower deck is on the ground during normal mowing operation.

FIG. 13 is a schematic rear view of the mounting mechanism when the deck is being raised and with the first member in abutment with the second member.

FIG. 14 is a schematic rear view of the mounting mechanism during the lifting operation after the deck begins pivoting about the second and third pivot mechanisms.

DETAILED DESCRIPTION OF THE PREFERRED EMBODIMENT

Figure 1:
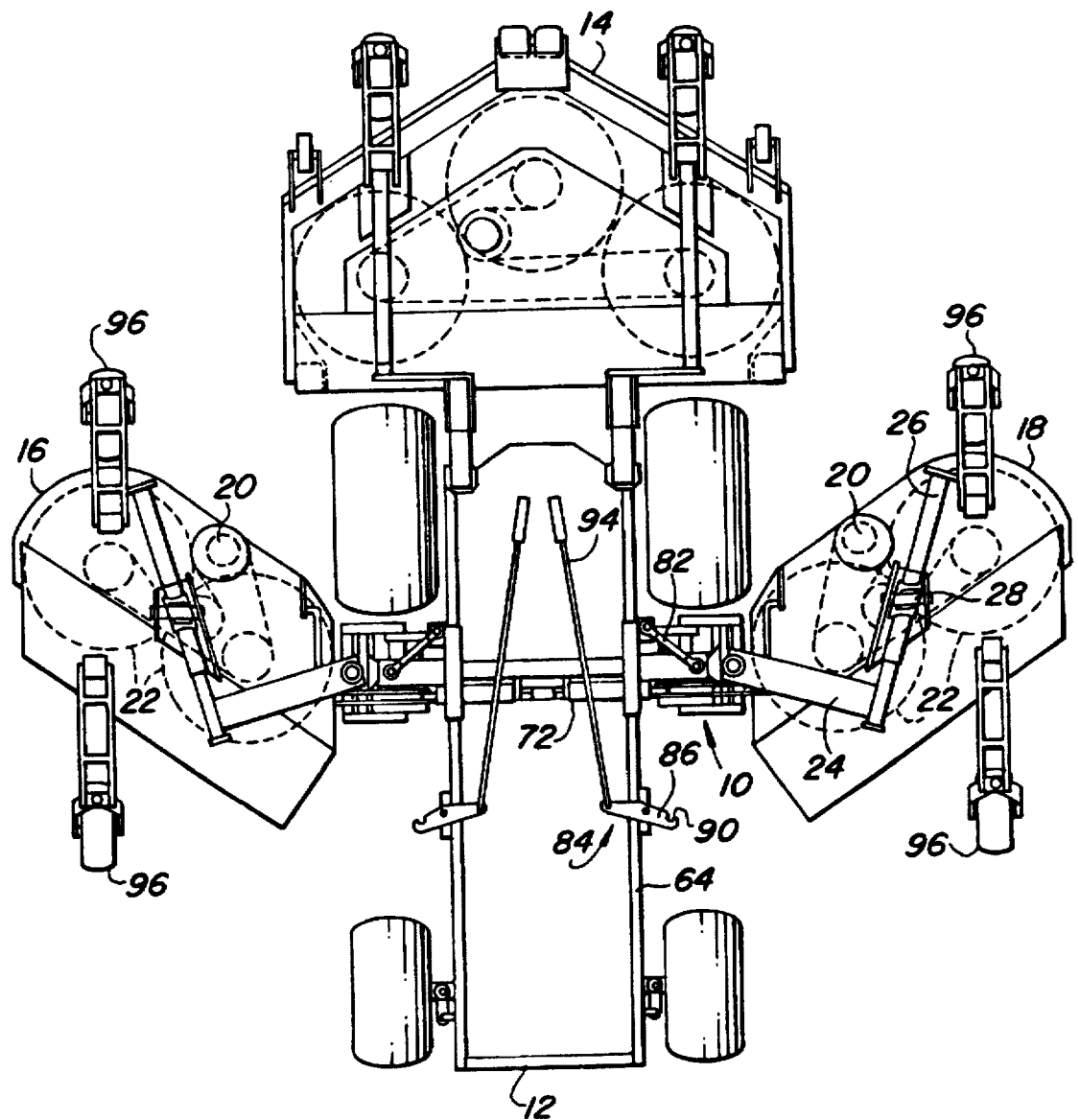
FIG. 1 is a plan view of a wide area mowing vehicle having wing decks coupled with the vehicle by the mounting mechanism according to the present invention.
Figure 2:
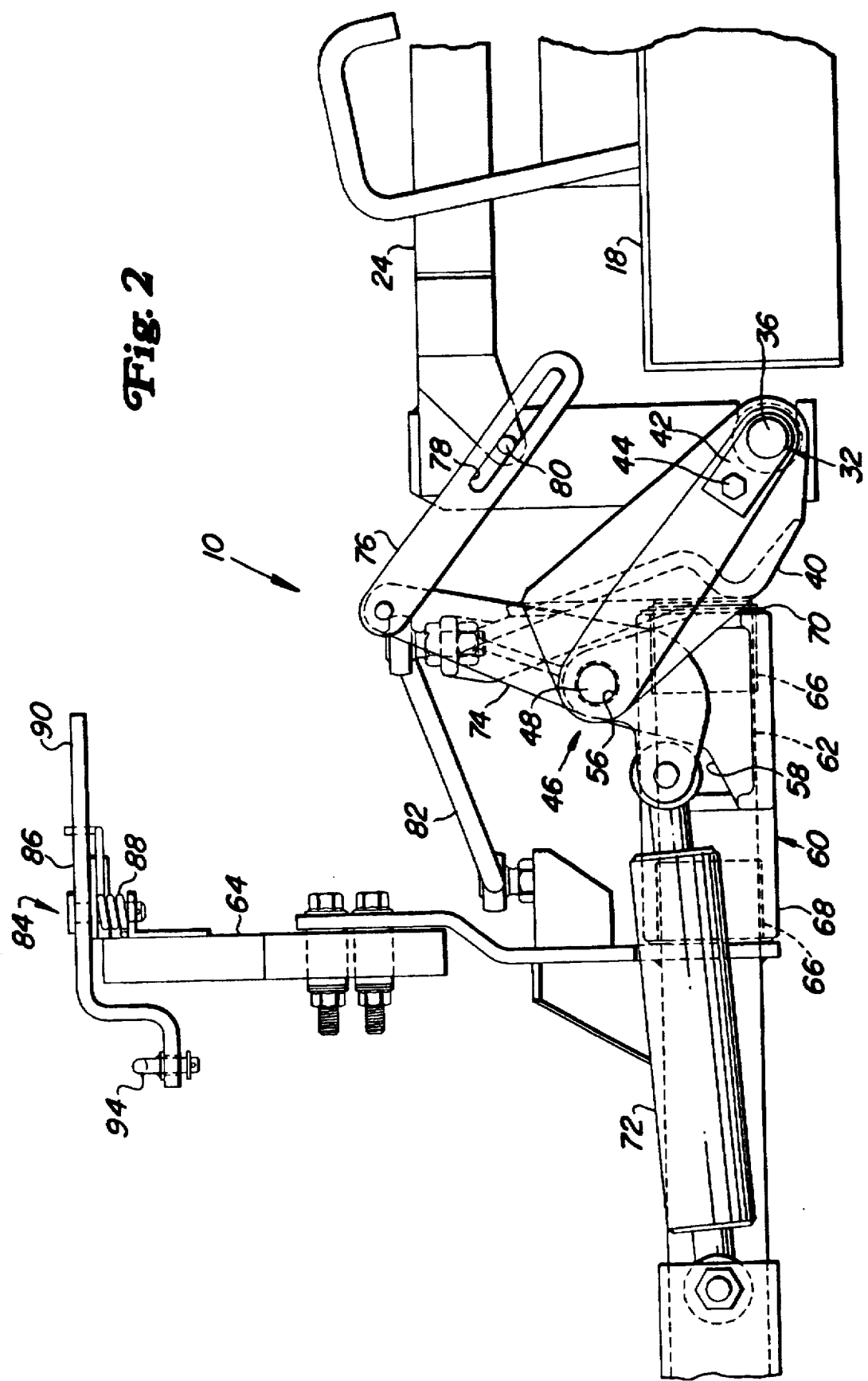
FIG. 2 is a rear view of the right mounting mechanism according to the present invention, showing the deck in position to pivot about the first pivot mechanism to closely follow ground undulations.

Referring to FIGS. 1–14, there is shown the wing deck mounting mechanism 10 according to the preferred embodiment of the present invention. As shown in FIG. 1, a vehicle 12 is provided with a front mowing deck 14 and left and right wing decks 16 and 18. Hydraulic motors 20 drive rotary mower blades 22 which rotate within the mower decks 14, 16 and 18 for cutting vegetation and grass as the vehicle 12 travels forwardly.

The present invention provides a mechanism for coupling the wing decks 16 and 18 to the vehicle 12. The mounting mechanism 10 on the right side of the vehicle 12 will be described in detail herein. The mounting mechanism 10 on the left side of the vehicle 12 is generally similar to the mechanism on the right side, and will therefore not be described in detail. An arm member or push arm 24 is coupled with the mower deck 18. A pivot mechanism and impact absorbing mechanism 26 couples the push arm 24 with the mower deck 18. The pivot mechanism 26 allows the mower deck 18 to pivot side to side about a generally fore and aft extending pivot axis defined by the impact absorbing mechanism 26 to thereby allow the mower deck 18 to more closely follow undulating ground contours. A pivot pin 28 carried by the push arm 24 extends laterally with respect to the vehicle 12 and allows the deck 18 to pivot front to back to closely follow ground contours.

The mounting mechanism 10 according to the present invention operatively couples the push arm 24 to the vehicle 12. A vertically extending first member 30 is fixed with the inner end portion of the push arm 24. The first member 30 is operatively coupled with and supported by a first pivot mechanism 32. The first member 30 is coupled to a sleeve 34 pivotally supported by a first shaft 36. The first shaft 36 is supported within openings 38 defined in a second member 40. A plate 42 is welded to the end of the first shaft 36 and is fixed by way of a bolt 44 to the second member 40. The second member 40 is pivotally coupled with and supported by a second pivot mechanism 46. The second pivot mechanism 46 includes a second shaft 48 welded to a plate 50 which is fixed by way of a bolt 52 to the second member 40. The second shaft 48 is received within openings 54 defined in the second member 40. The second shaft 48 is pivotally received by openings 56 in a third member 58 which is pivotally coupled with and supported by a third pivot mechanism 60. The third pivot mechanism 60 includes a third shaft 62 extending laterally outwardly from the vehicle frame 64. A pair of bearings 66 are mounted on the third shaft 62 and allow a tube 68 to pivot about the axis of the third shaft 62. The third member 58 is operatively fixed to the tube 68. A snap ring 70 fits on the end of the third shaft 62 for securing the tube 68 on the third shaft 62. A lift mechanism is also provided by the present invention. A hydraulic cylinder 72 has one end fixed to the frame 64 of the vehicle 12 and its other end operatively fixed to a lever member 74. The lever member 74 is pivotally supported by the second shaft 48. A strap 76 is pivotally coupled with the upper end portion of the lever member 74. A slot 78 is formed in the strap 76 for receiving a lift pin 80 which is fixed with the push arm 24.

The lift mechanism also provides a link member 82 which is coupled between the vehicle frame 64 and the second member 40 for pivoting the deck 18 rearwardly when lifted as will be described in greater detail below.

A latch mechanism 84 is also provided by the present invention. A latch plate member 86 is pivotally coupled with the vehicle frame 64, as seen in FIGS. 1–4. A torsion spring 88 biases the latch member 84 to its outward position whereat a hooked portion 90 of the latch member 84 will engage a hanger 92 fixed with the push arm 24 when the deck 18 is raised to a transport position. A control rod 94 which extends forwardly to the operator station can be locked in a latching mode wherein the latch member 86 is held in position to engage the hanger 92 and secure the deck 18 in a raised mode. The rod 94 also has an unlatched mode wherein the latch member 86 is held in a position such that the hanger 92 is not engaged by the hook portion 90 as the deck 18 is raised, thereby allowing the operator to quickly raise and lower the deck 18 between positions.

Next, the operation of the present invention will be described in greater detail. During normal mowing operations, the mower deck 18 is lowered to the ground where it will be supported by a plurality of caster wheels 96.

As the vehicle 12 travels forwardly, the push arm 24 mounted to the vehicle 12 will push the mower deck 18 forwardly with the vehicle 12. As undulating ground contours are encountered by the vehicle 12 and wing deck 18, the deck 18 can pivot with respect to the vehicle 12 to thereby enhance cut quality. The push arm 24 pivots about the axis of the first shaft 36 for allowing the mower 18 to pivot and ride over undulations. The first shaft 36 is located at a height generally level with the height of the cutting blades 22, thereby minimizing or eliminating any uncut strips of grass left standing when the deck 18 pivots with respect to the vehicle 12 over ground undulations. As the mower deck 18 and push arm 24 pivot with respect to the vehicle 12, the lift pin 80 slides within the slot 78 formed in the strap 76. The slot 78 allows the deck 18 to pivot approximately twenty degrees in either direction from its horizontal position. The second member 40 remains generally stationary in abutment with the end of the third shaft 62.

Figure 3:
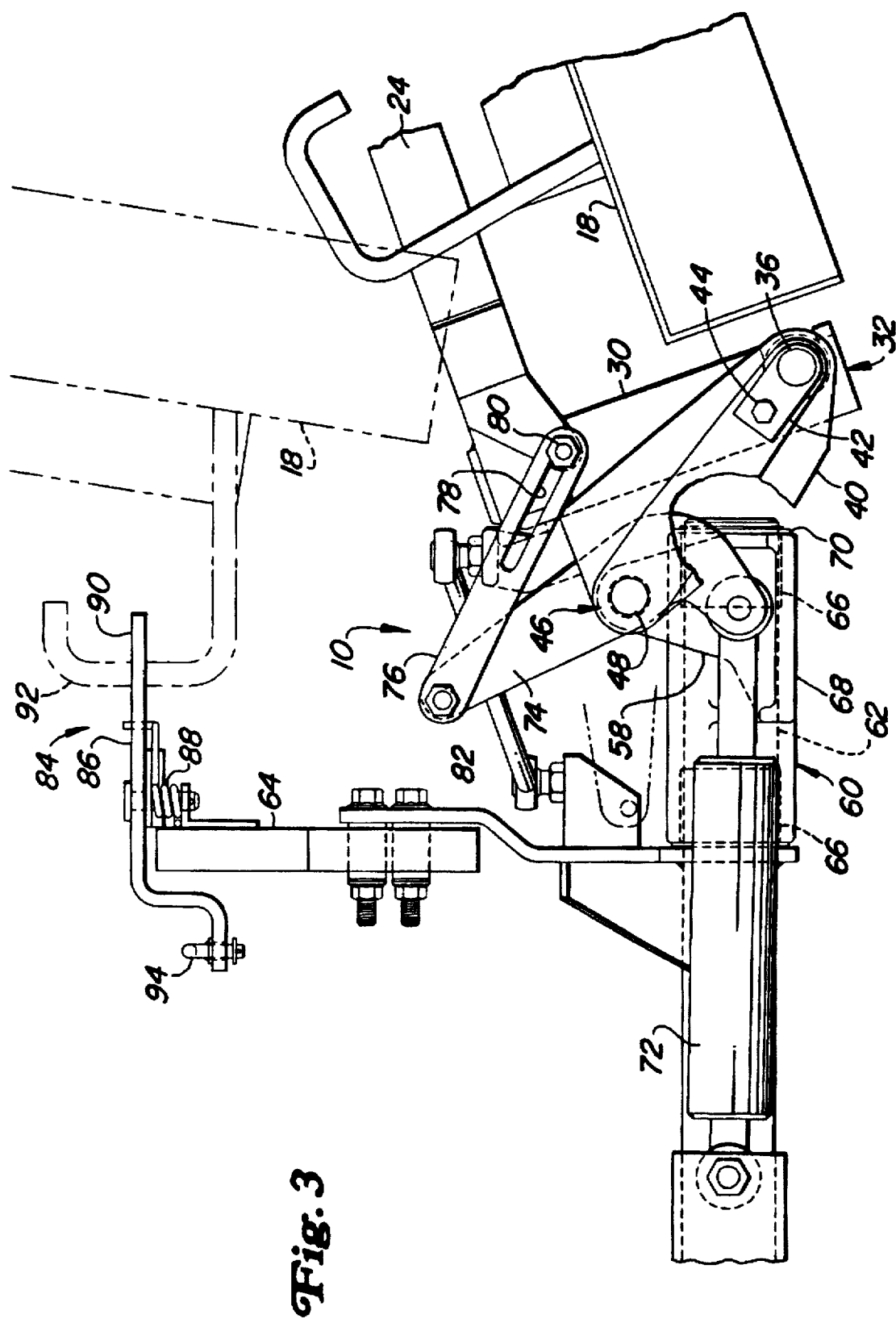
FIG. 3 is a rear view of the right mounting mechanism during the lift operation when the first member abuts the second member and when the deck begins pivoting about the second and third pivot mechanisms. The latch mechanism is also shown.

When the operator wishes to raise the deck 18 such as to pass over an obstruction or to latch the deck 18 in its transport position, the operator must first actuate the hydraulic lift cylinder 72. As the cylinder 72 extends, the lever member 74 will pivot from the position shown in FIG. 2 counterclockwise about its pivotal connection to the second member 40. This causes the upper end of the lever 74 to shift to the left as viewed in FIG. 2, which also pulls the strap 76 to the left. As the cylinder 72 is extended the strap 76 will shift toward the vehicle 12 until the end of the slot 78 abuts against the lift pin 80. As the cylinder 72 continues to extend, the strap 76 will raise the push arm 24, causing the first member 30, push arm 24 and mower deck 18 to pivot upwardly about the first pivot mechanism 32. As the first member 30 pivots about the first shaft 36, the first member 30 will eventually abut against the second member 40 as shown in FIG. 3, which blocks the first member 30 from pivoting further about the first shaft 36. Once this occurs, the first and second members 30 and 40, first pivot mechanism 32, push arm 24 and mower deck 18 begin pivoting upwardly together about the second shaft 48.

Figure 4:
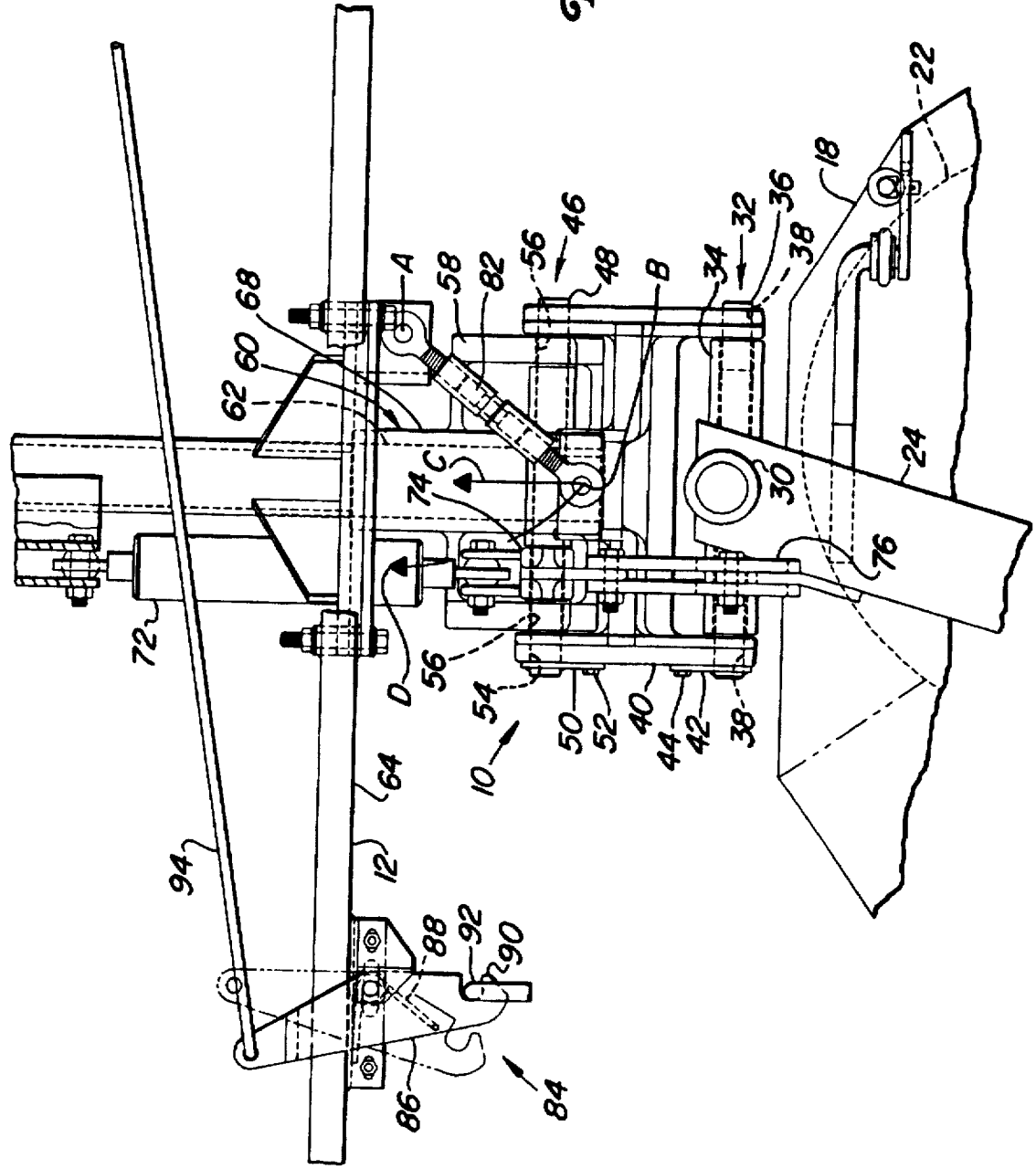
FIG. 4 is a plan view of the right mounting mechanism according to the present invention when the deck is on the ground during normal mowing operation.
Figure 5:
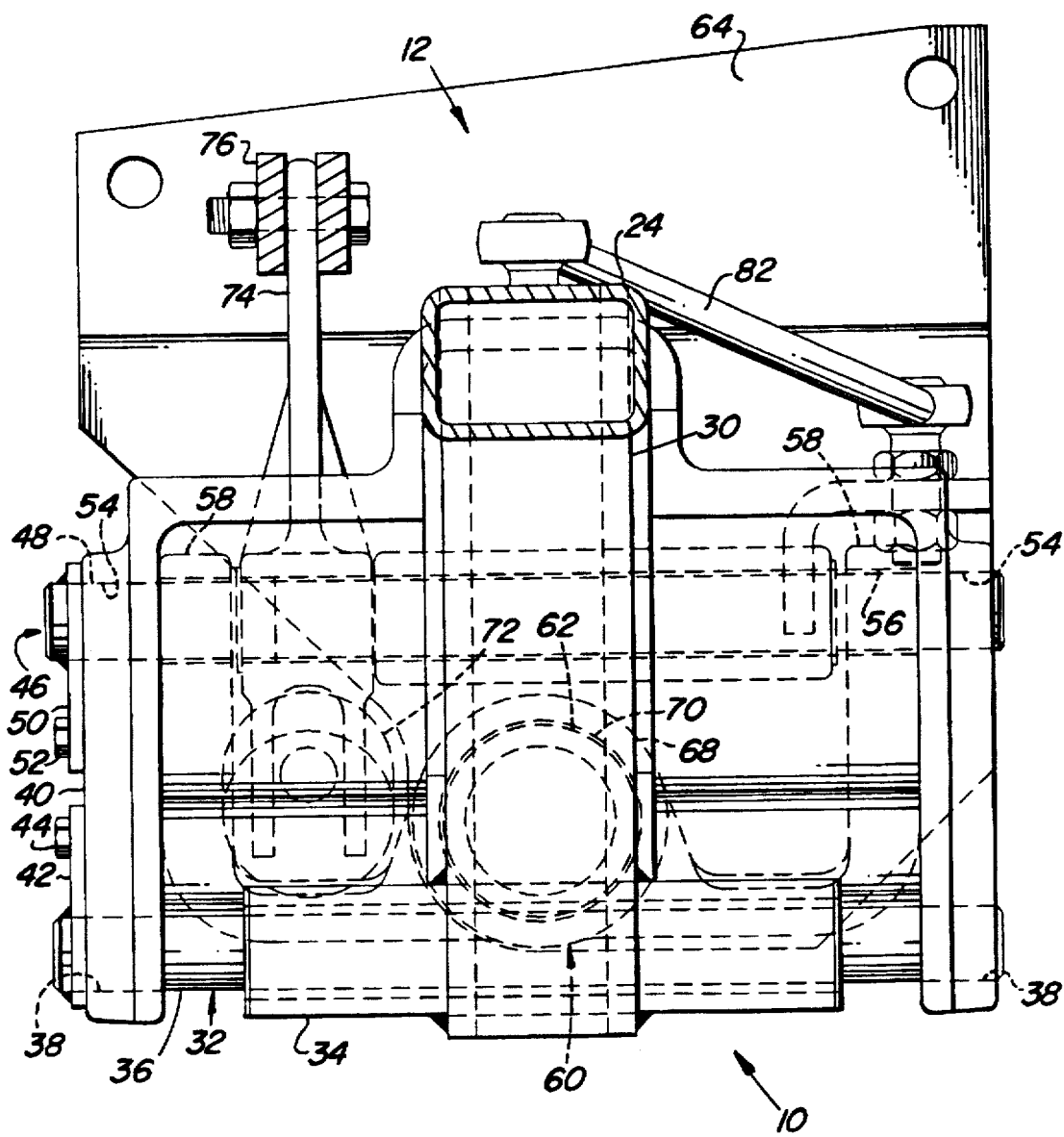
FIG. 5 is a side view of the right mounting mechanism when the wing deck is on the ground during normal mowing operations.

The link member 82 and third pivot mechanism 60 function to swing the wing deck 18 rearwardly during the lifting operation after the first member 30 has contacted the second member 40. As shown in FIG. 4, the generally rigid link member 82 extends between point A on the vehicle frame 64 and point B on the second member 40. The link member 82 provided by the present invention blocks the second member 40 from pivoting straight upwardly along line C, and causes point B to swing rearwardly along arc D. The link 82 maintains point B at a constant distance from point A, and thereby prevents point B from shifting straight upwardly along line C. Point B will remain a constant distance from point A as point B travels along arc D. The second member 40 pivots counterclockwise from its position shown in FIG. 5 about the axis defined by the third shaft 62 to allow point B to swing through the arc D. As the deck 18 is fully raised to its transport position it will pivot rearwardly about the axis defined by the third shaft 62 until the mounting mechanism 10 pivots to the position shown in FIG. 6.

Figure 6:
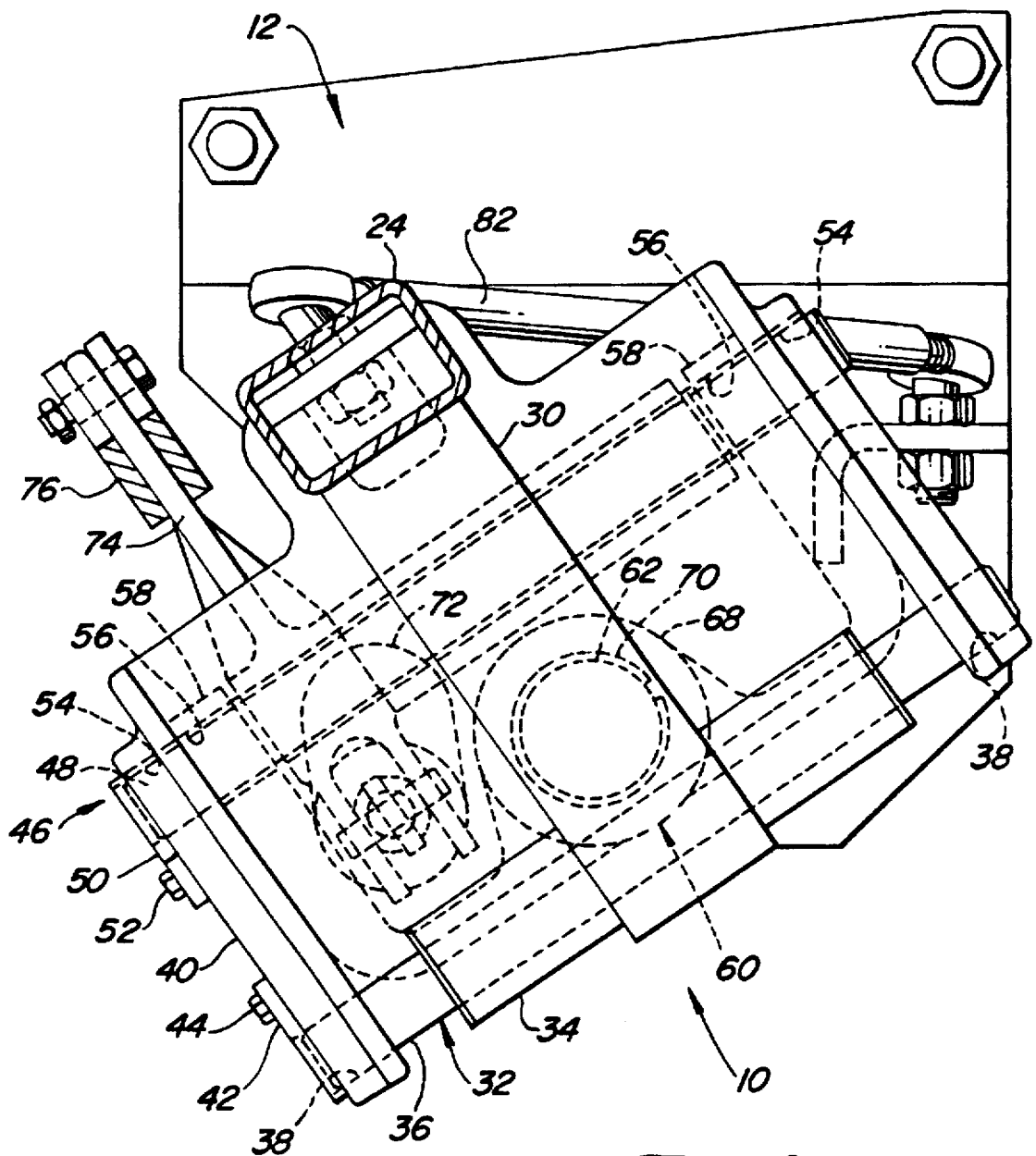
FIG. 6 is a side sectional view of the right mounting mechanism with the deck fully raised to its transport mode, showing the mechanism pivoted about the third pivot mechanism.
Figure 8:
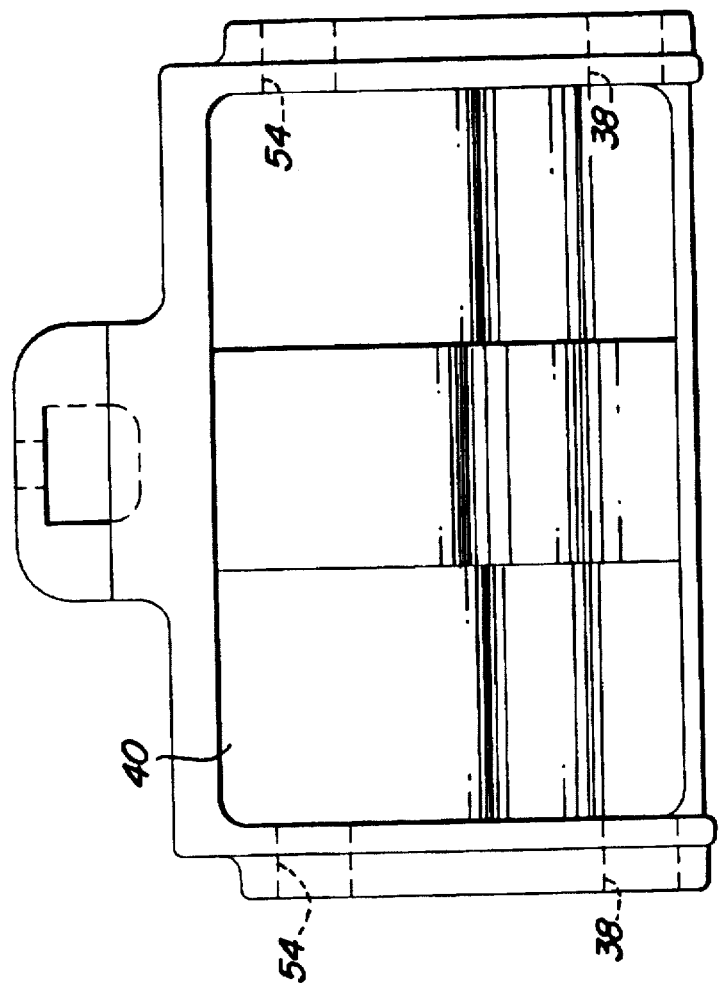
FIG. 8 is a side view of the second member.
Figure 7:
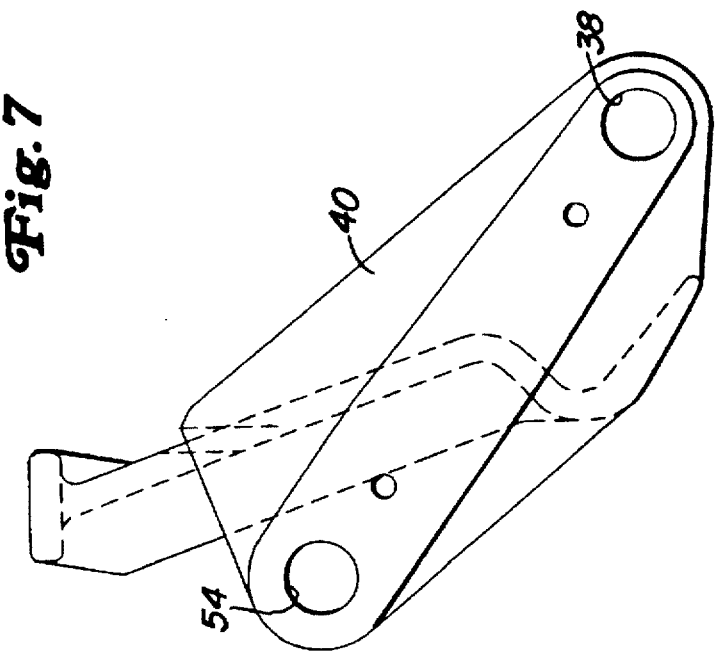
FIG. 7 is a rear view of the second member.
Figure 10:
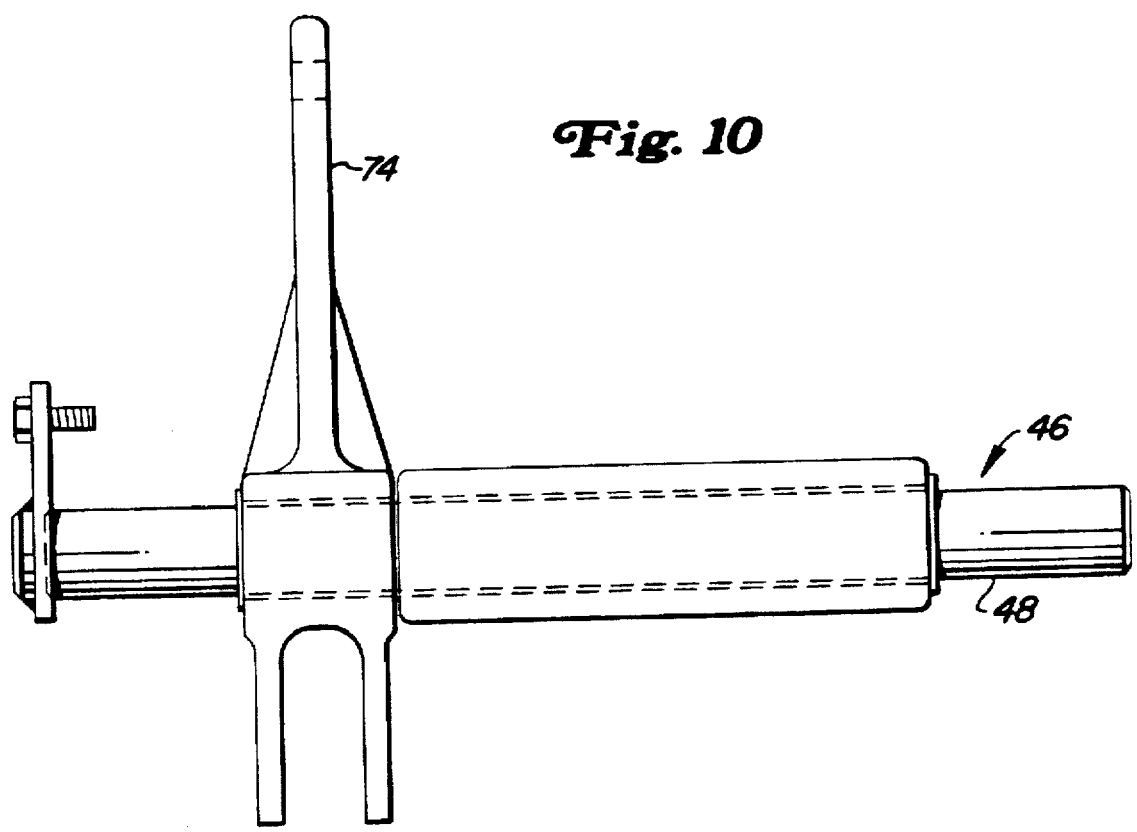
FIG. 10 is a side view of the lever arm and second pivot mechanism according to the present invention.
Figure 11:
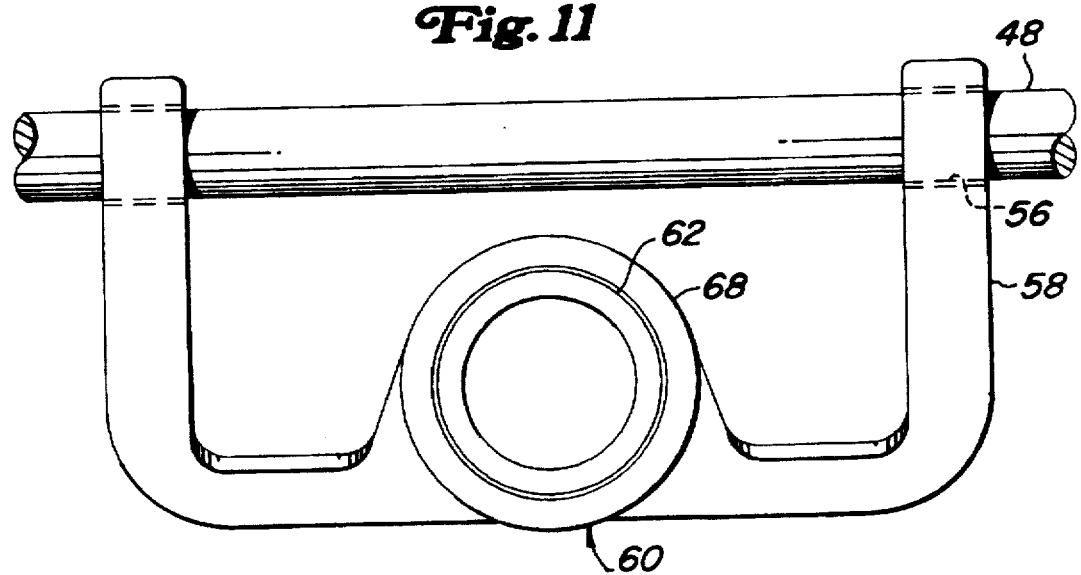
FIG. 11 is a side view of the third member and second and third pivot mechanisms and the third member.

Therefore, when the lift operation is initiated, the hydraulic cylinder 72 will extend, causing the lever 74 to pull the strap 76 toward the vehicle 12. As the strap 76 shifts toward the vehicle 12, the end of the strap's slot 78 will abut the lift pin 80. This will then pull the push arm 24 and mower deck 18 upwardly about the axis defined by the first shaft 36. As the cylinder 72 continues to extend, the first member 30 will eventually abut the second member 40. At this point the first and second members 30 and 40, first pivot mechanism 32, push arm 24 and deck 18 begin pivoting as a unit about both the second and third pivot mechanisms 46 and 60 simultaneously. The link member 82 initiates the pivoting of the mechanism 10 about the third pivot mechanism 60. Pivoting about the second pivot mechanism 46 causes the deck 18 to swing upwardly, and pivoting about the third pivot mechanism 60 causes the deck 18 to swing rearwardly. In the fully raised position, the mounting mechanism 10 is configured as shown in FIG. 6. The present invention requires only a single hydraulic cylinder 72 to accomplish both the upward and rearward pivoting of the wing deck 18.

To lower the deck 18, the operator retracts the hydraulic cylinder 72, which allows the top portion of the lever arm 74 and the strap 76 to shift to the right as viewed in FIG. 3 under the weight of the deck 18. Initially, the deck 18, push arm 24, first member 30, first pivot mechanism 32 and second member 40 will pivot about the second and third shafts 48 and 62. Pivoting about the second shaft 48 serves to lower the deck 18, and pivoting about the third shaft 62 serves to swing the deck 18 forwardly. As the cylinder 72 continues to retract, the second member 40 will eventually abut the end portion of the third shaft 62 and thereby be prevented from pivoting further. At this point the first member 30, push arm 24 and deck 18 begin pivoting about the first shaft 36 until the deck 18 is completely lowered to the ground.

The wing deck mounting mechanism 10 according to the present invention therefore provides a first pivot mechanism 32 that allows the mower deck 18 to pivot about an axis at generally the same elevation as the mower blades 22, and thereby generally minimizes or reduces any uncut strip of grass that might be left as the deck 18 pivots up or down over ground undulations. The present invention also provides a second pivot mechanism 46 about which the deck 18 pivots when raised by an operator to a transport position. The second pivot mechanism 46 is positioned relatively high such that the deck 18 can be pivoted upwardly relatively quickly by the operator to clear obstructions. The relatively high position of the second pivot mechanism 46 also provides high ground clearance when the deck 18 is raised. The lift mechanism according to the present invention also pivots the wing deck 18 to the rear as it is raised to the transport position. This rearward position allows the operator's sight lines to remain unobstructed and allows the operator sufficient clearance to climb into and out of the vehicle's operator station. The mounting mechanism 10 accomplishes all of these functions with relatively few parts and is simple in construction such that manufacturing and assembly costs are relatively low.

I claim:

1. An implement mounting and lift device which couples an implement to a vehicle, comprising:

a first member operatively coupled with the implement, a second member pivotally coupled with the first member via a first pivot mechanism, said second member being operatively pivotally coupled with the vehicle via a second pivot mechanism, the first pivot mechanism defines a pivot axis extending in a longitudinal direction with respect to the vehicle, and the second pivot mechanism defines a pivot axis extending in a longitudinal direction with respect to the vehicle, the axis of the second pivot mechanism being positioned at a location higher than the axis of the first pivot mechanism, a lift mechanism selectively operable by an operator for lifting the implement to a transport position, said lift mechanism being operatively coupled between the vehicle and the first member, and wherein the implement, arm and first member pivot about the first pivot mechanism to follow undulations in ground contours during normal operation of the implement, and when the lift mechanism is initiated the implement, arm and first member pivot about the first pivot mechanism until the first member operatively abuts the second member at which point the first and second members and implement begin pivoting about the second pivot mechanism to the transport position.

2. The invention of claim 1, and further comprising:

a third pivot mechanism having and axis extending in a horizontal direction and perpendicular to the axes of the first and second pivot mechanisms, and a link member extending between the vehicle and the second member for causing the implement and first and second members to pivot about both the second and third pivot mechanism after the first member abuts the second member as the implement is being lifted to the transport position.

3. The invention of claim 1, wherein:

the implement is a wing mower mounted to the side of the vehicle, the axis of the first pivot mechanism is positioned proximate the height of mower blades operating within the wing mower.

4. The invention of claim 3, and further comprising:

a link member operatively extending between the vehicle and the second member for causing the mower and first and second members to pivot about both the second and third pivot mechanisms after the first member abuts the second member as the mower is being lifted to the transport position.

5. The invention of claim 4 wherein the mower is lifted upwardly as the mower pivots about the first and second pivot mechanisms as the mower is lifted to the transport position, and the mower is shifted rearwardly as it pivots about the third pivot mechanism.

6. The invention of claim 1, and further comprising a latch mechanism selectively engagable by the operator between first and second modes, wherein in the first mode the latch mechanism allows the implement to be lifted and lowered between the implement's transport position and normal lowered operating position, and in the second mode the latch mechanism secures the implement in the implement's lifted transport position as soon as the lift mechanism has lifted the implement to its raised transport position.

7. An implement mounting and lift device which couples an implement to a vehicle, comprising:

a first member operatively coupled with the implement, a second member pivotally coupled with the first member via a first pivot mechanism, said second member being operatively pivotally coupled with the vehicle via a second pivot mechanism, the first pivot mechanism defines a pivot axis extending in a longitudinal direction with respect to the vehicle, and the second pivot mechanism defines a pivot axis extending in a longitudinal direction with respect to the vehicle, said axis of the second pivot mechanism being positioned higher than the axis of the first pivot mechanism, a lift mechanism selectively operable by an operator for lifting the implement to a transport position, said lift mechanism being operatively coupled between the vehicle and the first member, wherein the implement and first member pivot about the first pivot mechanism to follow undulations in ground contours during normal operation of the implement, and when the lift mechanism is initiated the implement and first member pivot about the first pivot mechanism until the first member abuts the second member at which point the first and second members and implement begin pivoting about the second pivot mechanism to the transport position, a third pivot mechanism having an axis extending in a horizontal direction and perpendicular to the axes of the first and second pivot mechanisms, a link member operatively extending between the vehicle and the second member for causing the implement and first and second members to pivot about both the second and third pivot mechanism after the first member abuts the second member as the implement is being lifted to the transport position, wherein said implement is a wing mower mounted to the side of the vehicle, and the axis of the first pivot mechanism is positioned proximate the height of mower blades operating within the wing mower.

8. The invention of claim 7, wherein the mower is lifted upwardly as the mower pivots about the first and second pivot mechanisms as the mower is lifted to the transport position, and the mower is shifted rearwardly as it pivots about the third pivot mechanism.

* * * * *